(12) United States Patent
Sarap et al.

(10) Patent No.: US 8,376,045 B2
(45) Date of Patent: Feb. 19, 2013

(54) FLUID LOSS ADDITIVE CONTAINING A BIODEGRADABLE GRAFTED COPOLYMER FOR A CEMENT COMPOSITION

(75) Inventors: Girish Dinkar Sarap, Pune (IN); Abhijit Tarafdar, Pune (IN); Remitha Ak, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 393 days.

(21) Appl. No.: 12/817,415

(22) Filed: Jun. 17, 2010

(65) Prior Publication Data

US 2011/0308800 A1     Dec. 22, 2011

(51) Int. Cl.
     *E21B 33/138*     (2006.01)
(52) U.S. Cl. ........................................ 166/293; 166/300
(58) Field of Classification Search ........................ None
See application file for complete search history.

(56) References Cited

U.S. PATENT DOCUMENTS

| | | | |
|---|---|---|---|
| 5,499,677 | A | 3/1996 | Cowan |
| 6,840,319 | B1 | 1/2005 | Chatterji et al. |
| 7,067,000 | B1 | 6/2006 | Szymanski et al. |
| 7,399,355 | B2 | 7/2008 | Szymanski et al. |
| 2010/0122816 | A1 | 5/2010 | Lewis et al. |
| 2010/0160488 | A1 * | 6/2010 | Assmann et al. .............. 523/130 |
| 2011/0132605 | A1 | 6/2011 | Sarap et al. |

FOREIGN PATENT DOCUMENTS

EP     1881016 A2     1/2008

\* cited by examiner

*Primary Examiner* — Zakiya W Bates
(74) *Attorney, Agent, or Firm* — Craig W. Roddy; Sheri Higgins Law

(57) ABSTRACT

A fluid loss additive comprises a biodegradable grafted copolymer, wherein the copolymer comprises: (i) a first polymer comprising a monomer or monomers selected from the group consisting of acrylamido-2-methylpropane sulfonic acid, N-N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (ii) a second polymer, wherein the first polymer is grafted onto the second polymer. A method of cementing in a low-temperature subterranean formation comprises: introducing a cement composition into the subterranean formation comprising: (i) cement; (ii) water; and (iii) the fluid loss additive; and allowing the cement composition to set. According to another embodiment, a method of cementing in a high-temperature subterranean formation comprises: introducing a cement composition into the subterranean formation comprising: (i) cement; (ii) water; (iii) a clay; and (iv) the fluid loss additive; and allowing the cement composition to set.

26 Claims, 3 Drawing Sheets

FLUID LOSS ADDITIVE CONTAINING A BIODEGRADABLE GRAFTED COPOLYMER FOR A CEMENT COMPOSITION

TECHNICAL FIELD

A cement composition containing a fluid loss additive with a biodegradable grafted copolymer is provided. A method of cementing in a subterranean formation using the fluid loss additive is also provided. In an embodiment, the subterranean formation is penetrated by a well.

SUMMARY

According to an embodiment, a cement composition comprises: cement; water; and a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer. According to another embodiment, the cement composition further comprises a clay.

According to an embodiment, a method of cementing in a low-temperature subterranean formation comprises: introducing a cement composition into the subterranean formation, the cement composition comprising: (i) cement; (ii) water; and (iii) a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer; and allowing the cement composition to set.

According to another embodiment, a method of cementing in a high-temperature subterranean formation comprises: introducing a cement composition into the subterranean formation, the cement composition comprising: (i) cement; (ii) water; (iii) a clay; and (iv) a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer; and allowing the cement composition to set.

BRIEF DESCRIPTION OF THE FIGURES

The features and advantages of certain embodiments will be more readily appreciated when considered in conjunction with the accompanying figures. The figures are not to be construed as limiting any of the preferred embodiments.

VA-5637-160 fluid loss additive is a grafted copolymer containing a copolymer backbone containing gelatin and acrylamido-2-methylpropane sulfonic acid (AMPS)-co-N—N dimethyl acrylamide (NNDMA). The ratio of the gelatin backbone to AMPS-co-NNDMA was in the range of 1:10 to 10:1 by weight (grams). VA-5637-160 has an average molecular weight of 50,000. THERMA-VIS™ viscosifier is lithium magnesium sodium silicate, which is a synthetic hectorite clay.

DETAILED DESCRIPTION

Figure 1:
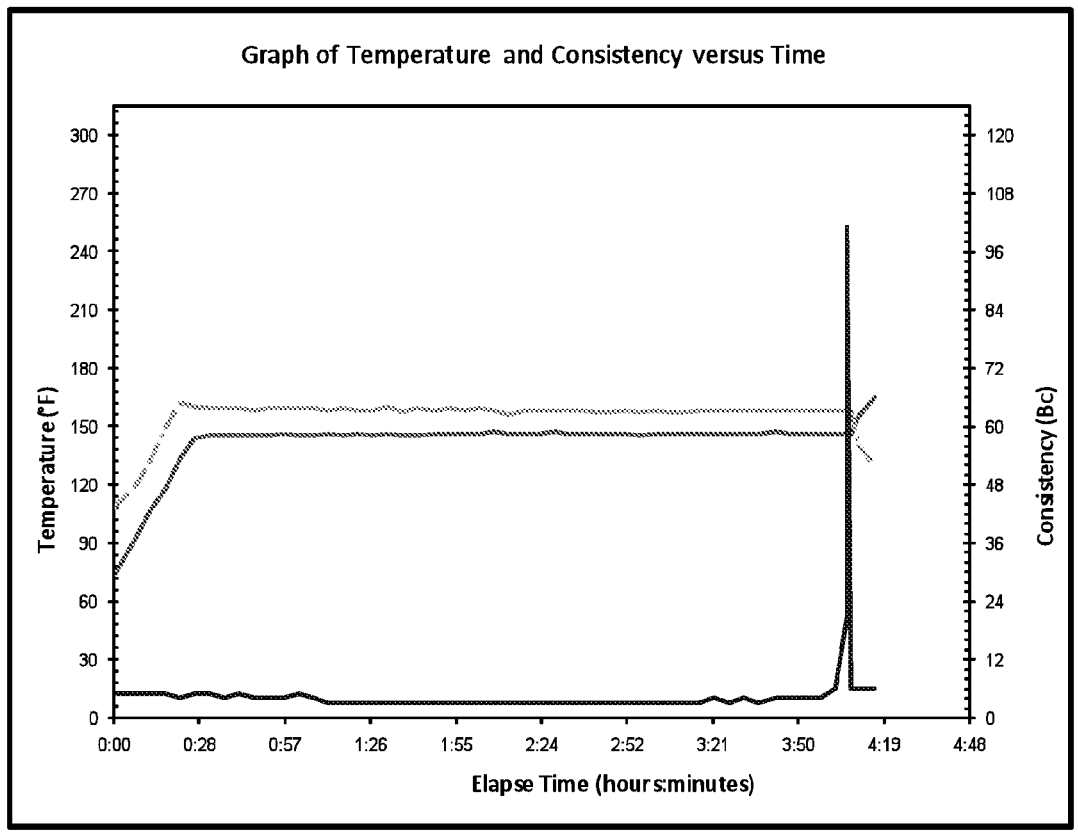
FIG. 1 is a graph of temperature (° F.) and consistency (Bc) versus time (hr:min) showing the thickening time at a temperature of 150° F. (66° C.) and a pressure of 5,500 psi (38 MPa) for a cement composition in salt water having a density of 16.4 pounds per gallon (ppg) (2 kilograms per liter (kg/l)). The cement composition contained: Joppa Class H cement; deionized (DI) water; 10% by weight of the water (ww) NaCl; 1% by weight of the cement (bwc) VA-5637-160 fluid loss additive; 0.3% bwc CFR-3™ friction reducer; and 0.05 gallons per sack of cement (gal/sk) D-AIR 3000™ defoamer.

As used herein, the words "comprise," "have," "include," and all grammatical variations thereof are each intended to have an open, non-limiting meaning that does not exclude additional elements or steps.

It should be understood that, as used herein, "first," "second," and "third," are arbitrarily assigned and are merely intended to differentiate between two or more polymers, monomers, fluids, etc., as the case may be, and does not indicate any sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. As used herein, a "fluid" can have more than one distinct phase. For example, a "fluid" can be a colloid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

As used herein, a "cement composition" is a mixture of at least cement and water, and possibly other additives. As used herein, the term "cement" means an initially dry substance that, in the presence of water, acts as a binder to bind other materials together. An example of cement is Portland cement. A cement composition is generally a slurry in which the water is the continuous phase of the slurry and the cement (and any other insoluble particles) is the dispersed phase. The continuous phase can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between a tubing string and the inside of a casing in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations.

However, fluids, such as water, included in a cement composition can penetrate into the surrounding subterranean formation. This is commonly referred to as fluid loss. The loss of significant amounts of fluid from the cement composition into the formation can adversely affect, inter alia, the viscosity, thickening time, setting time, and compressive strength of the cement composition. Therefore, it is common to include a fluid loss additive in a cement composition in order to help minimize the amount of fluid that is lost from the cement composition into the subterranean formation.

Polymers have been used as a fluid loss additive. A polymer is a large molecule composed of repeating units typically connected by covalent chemical bonds. A polymer can be a cross-linked polymer. As used herein, a "cross-link" or "cross-linking" is a connection between two or more polymer molecules. A polymer is formed from the polymerization reaction of monomers. A polymer formed from one type of monomer is called a homopolymer. A polymer formed from two or more different types of monomers is called a copolymer. In the polymerization reaction, the monomers are transformed into the repeating units of a polymer. The number of repeating units of a polymer can range from approximately 4 to greater than 10,000. The number of repeating units of a polymer is referred to as the chain length of the polymer. The conditions of the polymerization reaction can be adjusted to help control the average number of repeating units (the average chain length) of a polymer. A polymer has an average molecular weight, which is directly related to the average chain length of the polymer. Cross-linking polymer molecules can increase the molecular weight of the polymer.

The average molecular weight for a copolymer can be expressed as follows:

$$\text{Avg. molecular weight} = (M.W.m_1 * RU\, m_1) + (M.W.m_2 * RU\, m_2)\ldots$$

where $M.W.m_1$ is the molecular weight of the first monomer; $RU\, m_1$ is the number of repeating units of the first monomer; $M.W.m_2$ is the molecular weight of the second monomer; and $RU\, m_2$ is the number of repeating units of the second monomer. Of course, a terpolymer would include three monomers, a tetrapolymer would include four monomers, and so on.

For a copolymer, the repeating units for each of the monomers can be arranged in various ways along the polymer chain. For example, the repeating units can be random, alternating, periodic, or block.

A copolymer can be a grafted copolymer. A grafted copolymer is a branched copolymer formed from a first polymer being grafted onto a second polymer, where the first and second polymer are structurally distinct. The second polymer is often referred to as the backbone of the grafted copolymer. The first polymer can be a homopolymer or a copolymer and the second polymer can be a homopolymer or a copolymer. For example, a first homopolymer can be formed and a second homopolymer can be formed. During a polymerization reaction, the first homopolymer can be grafted onto the second homopolymer backbone to form the grafted copolymer.

For a grafted copolymer, the first and second polymers will each have an average molecular weight. Also, during the polymerization reaction, the ratio of the first polymer to the second polymer can be controlled. For example, the grafted copolymer can have a ratio of the grams of the second polymer to the grams of the first polymer of 2:1. This ratio corresponds to the grafted copolymer having approximately 66% of the second polymer and approximately 33% of the first polymer, based on weight. The grafted copolymer will also have an average molecular weight. The average molecular weight of the grafted copolymer can be determined based on the molecular weight of each of the first and second polymers and the ratio of the polymers.

The molecular weight of a polymer (such as a polymer, cross-linked polymer, or grafted copolymer) can affect some of its characteristics, such as water solubility or biodegradability. In general, as the molecular weight of a polymer increases, its solubility decreases. As a result, some high molecular weight polymers can become less soluble when their molecular weight increases above a certain limit. In most of the cases, polymers which are used as an effective fluid loss additive for cementing operations in a well are water swellable, mainly because the polymer has a high molecular weight. As used herein, the term "water swellable" means that the polymer can absorb water and can swell. As used herein, a "low molecular weight polymer" means a polymer with an average molecular weight of less than 50,000. As used herein, a "high molecular weight polymer" means a polymer with an average molecular weight of 50,000 or greater.

Some nations have implemented environmental regulations which set standards for the biodegradability of wellbore fluids (especially for off-shore drilling). Biodegradability is the process by which complex molecules are broken down by microorganisms to produce simpler compounds. Generally, as the molecular weight of a polymer increases, its biodegradability tends to decrease. As a result, in most of the cases, high molecular weight polymers may not satisfy the new environmental regulations and thus, the polymers may not be able to be used.

Some conventional fluid loss additives have been prepared with a biodegradable grafted copolymer. In order to make the grafted copolymer biodegradable, the copolymer can include: a high molecular weight biodegradable backbone; a higher percentage of a biodegradable backbone; or a grafted copolymer with a low molecular weight.

As used herein, a polymer (such as a polymer, cross-linked polymer, or grafted copolymer) is considered "biodegradable" if the polymer passes the OECD TG 306: Closed Bottle Seawater test. In accordance with Organisation for Economic Co-operation and Development (OECD) guidelines, a polymer showing more than 20% biodegradability in 28 days according to the 306 test can be classified as primary biodegradable. A polymer showing more than 60% biodegradability in 28 days (or if the polymer is just below the 60% mark, then the test period can be extended by a few days) according to the 306 test can be classified as ultimate biodegradable, and it may be assumed that the polymer will undergo rapid and ultimate degradation in a marine environment. A polymer that can be classified as primary or ultimate biodegradable, passes the 306 test. Seawater generally contains the following major elements (by percentage): 85.84% oxygen; 10.82% hydrogen; 1.94% chlorine; 1.08% sodium; 0.13% magnesium; 0.09% sulfur; 0.04% calcium; 0.04% potassium; 0.007% bromine; and 0.003% carbon. The 306 test is performed as follows. A solution of the polymer in seawater, usually at 2-5 milligrams per liter (mg/L), is inoculated with a relatively small number of microorganisms from a mixed population and kept in completely full, closed bottles in the dark at a constant temperature. Degradation is followed by analysis of dissolved oxygen over a 28 day period. The amount of oxygen taken up by the microbial population during biodegradation of the test polymer, corrected for uptake by the blank inoculum run in parallel, is expressed as a percentage of ThOD or, less satisfactorily COD.

Some conventional fluid loss additives formed from a biodegradable grafted copolymer have poor thermal stability. Thermal stability refers to the ability of a material to keep its physico-chemical properties unaltered up to a certain temperature. At a temperature above the certain temperature, the polymer may degrade. For example, if a polymer for a fluid loss additive has poor thermal stability and is introduced into a high-temperature subterranean formation, then the polymer can degrade and loose its physico-chemical properties and may no longer function as a fluid loss additive. As used herein, "high-temperature" refers to a subterranean formation with a bottomhole temperature of greater than 190° F. As used herein, the term "bottomhole" refers to the portion of the subterranean formation to be cemented. As used herein, "low-temperature" refers to a subterranean formation with a bottomhole temperature of less than 190° F. By increasing the thermal stability of a material, the temperature at which the material can degrade is increased.

When added to a cement composition, a water-swellable polymer, acting as a fluid loss additive, can absorb the water in the cement composition. As a result, the viscosity of the cement composition can increase gradually when the fluid loss additive is added, and the cement composition may become unpumpable when these types of fluid loss additives are added beyond a certain concentration. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is 1/100 P.

Rheology is a unit-less measure of how a material deforms and flows. Rheology includes the material's elasticity, plasticity, and viscosity. As used herein, the "rheology" of a material, such as a cement composition, is measured as follows. The material to be tested is prepared. The material is placed into the test cell of a rotational viscometer, such as a FANN® Model 35 viscometer, fitted with a FANN® yield stress adapter (FYSA) and a spring number 1. The material is tested at the specified temperature and ambient pressure, about 1 atm (0.1 MPa). Rheology readings are taken at multiple rpm's, for example, at 3, 6, 30, 60, 100, 200, and 300.

It has been discovered that a cement composition containing a fluid loss additive of a grafted copolymer can be used in a low-temperature subterranean formation. It has also been discovered that a cement composition containing a clay and a fluid loss additive of a grafted copolymer can be used in a high-temperature subterranean formation.

During cementing operations, it is desirable for the cement composition to remain pumpable during introduction into the subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes, and a cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., thickening time or compressive strength) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about −16° C./min to about −15° C./min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition sample taken at a specified time after mixing and by breaking the samples in a compression-testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

Fluid loss from a cement composition can occur. As used herein, for a testing temperature of 190° F. (88° C.) or less, the fluid loss of a cement composition is tested according to the API Static Fluid Loss procedure at a specified temperature and pressure differential as follows. The cement composition is mixed. The cement composition is placed into an atmospheric consistometer, such as a FANN® Model 165 AT consistometer, heated to the specified temperature, and then maintained at the specified temperature for 20 minutes. A test cell of a fluid loss test assembly, such as a FANN® fluid loss test assembly, is pre-heated to the specified temperature. The cement composition is then placed into the test cell of the fluid loss test assembly. The cement composition is then tested for fluid loss at the specified pressure differential. Fluid loss is measured in milliliters (mL). The total mL of fluid loss is then multiplied by 2 to obtain the API fluid loss for the cement composition and expressed in units of mL/30 min.

As used herein, for a testing temperature above 190° F. (88° C.), the fluid loss of a cement composition is tested according to the Stirring Fluid Loss procedure at a specified temperature and pressure differential as follows. The cement composition is mixed. The cement composition is placed into a test cell of a fluid loss test assembly, such as a Stirring Fluid Loss Test Assembly, available from FANN Instruments. The test cell and cement composition are ramped up to the specified temperature. After the cement composition has reached the specified temperature, the cement composition is tested for fluid loss at the specified pressure differential. Fluid loss is measured in milliliters (mL). The total mL of fluid loss is then multiplied by 2 to obtain the API fluid loss for the cement composition and expressed in units of mL/30 min.

According to an embodiment, a cement composition comprises: cement; water; and a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer. According to another embodiment, the cement composition further comprises a clay.

The discussion of preferred embodiments regarding the cement composition, or any ingredient in the cement composition, is intended to apply to the composition embodiments and the method embodiments. Any reference to the unit "gallons" means U.S. gallons. As used herein, the term "soluble" means that at least 1 part of the substance dissolves in 99 parts of the liquid at a temperature of 77° F. (25° C.) and a pressure of 1 atm (0.1 MPa). As used herein, the term "insoluble" means that less than 1 part of the substance dissolves in 99 parts of the liquid at a temperature of 77° F. (25° C.) and a pressure of 1 atm (0.1 MPa).

The cement composition includes cement. The cement can be Class A cement, Class C cement, Class G cement, Class H cement, and any combination thereof. Preferably, the cement is Class G cement or Class H cement.

The cement composition includes water. The water can be selected from the group consisting of freshwater, brackish water, saltwater, and any combination thereof. The cement composition can further include a water-soluble salt. Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 35% by weight of the water (ww).

In one embodiment, the cement composition includes a clay. The clay can be a natural clay or a synthetic clay. The clay can be selected from the group consisting of hectorite, bentonite, attapulgite, sepiolite, and combinations thereof. Preferably, the clay is hectorite. Preferably, the clay is hydrophilic. Preferably, the clay is capable of interacting with the grafted copolymer to form a clay/grafted copolymer composite. A commercially-available example of a suitable clay is THERMA-VIS™ marketed by Halliburton Energy Services, Inc.

In one embodiment, the clay is in a concentration of at least 0.05% by weight of the cement (bwc). In another embodiment, the clay is in a concentration in the range of about 0.05% to about 10% bwc. In another embodiment, the clay is in a concentration in the range of about 1% to about 3% bwc.

The cement composition includes a fluid loss additive comprising a biodegradable grafted copolymer. A commercially-available example of a suitable biodegradable grafted copolymer is VA-5637-160 from BASF in Florham Park, N.J., USA. The copolymer comprises a first polymer comprising a monomer or monomers selected from the group consisting of acrylamido-2-methylpropane sulfonic acid (AMPS), N—N dimethyl acrylamide (NNDMA), N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof. The first polymer can also consist essentially of a monomer or monomers selected from the group consisting of AMPS, NNDMA, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof. The first polymer can be a homopolymer or a copolymer. In one embodiment, the first polymer has an average molecular weight of at least 150. In another embodiment, the first polymer has an average molecular weight of at least 200. In another embodiment, the first polymer has an average molecular weight in the range of about 150 to about 1,000.

The grafted copolymer comprises a second polymer. The second polymer can be water swellable. The second polymer can be water insoluble. The second polymer can comprise a monomer or monomers selected from the group consisting of gelatin, starch, water-soluble proteins, xanthan, guar, lignins, tannins, cellulose, acrylic acid, acrylamide, derivatives of any of the foregoing, and any combination of any of the foregoing. The second polymer can also consist essentially of a monomer or monomers selected from the group consisting of gelatin, starch, water-soluble proteins, xanthan, guar, lignins, tannins, cellulose, acrylic acid, acrylamide, derivatives of any of the foregoing, and any combination of any of the foregoing. Preferably, one of the monomers is gelatin. The second polymer can be a homopolymer or a copolymer. In one embodiment, the second polymer has an average molecular weight of at least 150. In another embodiment, the second polymer has an average molecular weight of at least 200. In another embodiment, the second polymer has an average molecular weight in the range of about 150 to about 10,000.

The first polymer is grafted onto the second polymer. The second polymer is the backbone of the grafted copolymer. In one embodiment, the ratio of grams of the second polymer to grams of the first polymer is 1:1. For example, the first polymer can be 50% and the second polymer can be 50% by weight of the grafted copolymer. In another embodiment, the ratio of grams of the second polymer to grams of the first polymer is in the range of about 10:1 to about 1:10. For example, the second polymer can be in the range of about 9% to about 91% and the first polymer can be in the range of about 91% to about 9% by weight of the grafted copolymer. In another embodiment, the ratio of grams of the second polymer to grams of the first polymer is in the range of about 3:2 to about 1:1. In an embodiment, the ratio is such that the grafted copolymer is thermally stable at a temperature in the range of 80° F. to 190° F. In another embodiment, the ratio is such that the grafted copolymer is thermally stable at a temperature in the range of 190° F. to 250° F. For example, to increase the thermal stability of the grafted copolymer, the percentage of the second polymer can be decreased. Another way to increase the thermal stability of the grafted copolymer is to include a clay in the cement composition.

In one embodiment, the grafted copolymer has an average molecular weight of at least 5,000. In another embodiment, the grafted copolymer has an average molecular weight of at least 25,000. In another embodiment, the grafted copolymer has an average molecular weight in the range of about 5,000 to about 2,000,000. In an embodiment, the average molecular weight is such that the viscosity of the grafted copolymer in a cement composition is less than 50,000 cP. In another embodiment, the average molecular weight is such that the viscosity of the grafted copolymer in a cement composition is less than 25,000 cP. For example, to decrease the viscosity of the grafted copolymer in a cement composition, the molecular weight of the grafted copolymer can be decreased. By way of another example, the viscosity can be decreased by decreasing the molecular weight of the first polymer or increasing the percentage of the first polymer in the grafted copolymer.

In one embodiment, the fluid loss additive is in a concentration of at least 0.05% by weight of the cement (bwc). In another embodiment, the fluid loss additive is in a concentration in the range of about 0.05% to about 5% bwc. In another embodiment, the fluid loss additive is in a concentration in the range of about 2% to about 4% bwc. In an embodiment, the fluid loss additive is in a concentration equal to or less than a sufficient concentration such that the viscosity of the fluid loss additive in a cement composition is less than 50,000 cP. In another embodiment, the fluid loss additive is in a concentration equal to or less than a sufficient concentration such that the viscosity of the fluid loss additive in a cement composition is less than 25,000 cP.

In an embodiment, the cement composition has a thickening time of at least 3 hours at a temperature of 150° F. (66° C.) and a pressure of 5,500 psi (38 MPa). In another embodiment, the cement composition has a thickening time in the range of about 4 to about 15 hours at a temperature of 150° F. (66° C.) and a pressure of 5,500 psi (38 MPa). Some of the variables that can affect the thickening time of the cement composition include the concentration of any set retarder included in the cement composition, the concentration of any salt present in the cement composition, and the bottomhole temperature of the subterranean formation. In another embodiment, the cement composition has a thickening time of at least 3 hours at the bottomhole temperature and pressure of the subterranean formation.

In one embodiment, the cement composition has an initial setting time of less than 24 hours at a temperature of 150° F. (66° C.) and a pressure of 3,000 psi (21 MPa). In another embodiment, the cement composition has an initial setting time of less than 24 hours at the bottomhole temperature and pressure of the subterranean formation.

Preferably, the cement composition has a setting time of less than 48 hours at a temperature of 150° F. (66° C.). More preferably, the cement composition has a setting time of less than 24 hours at a temperature of 150° F. (66° C.). Most preferably, the cement composition has a setting time in the range of about 3 to about 24 hours at a temperature of 150° F. (66° C.). In another embodiment, the cement composition has a setting time of less than 48 hours at the bottomhole temperature and pressure of the subterranean formation.

Preferably, the cement composition has a compressive strength of at least 500 psi (3.5 MPa) when tested at 24 hours, a temperature of 150° F. (66° C.), and a pressure of 3,000 psi (21 MPa). More preferably, the cement composition has a compressive strength in the range of about 500 to about 10,000 psi (about 3.5 to about 69 MPa) when tested at 24 hours, a temperature of 150° F. (66° C.), and a pressure of 3,000 psi (21 MPa).

The cement composition can further include an additional additive. Examples of an additional additive include, but are not limited to, a filler, a set retarder, a friction reducer, a strength-retrogression additive, a high-density additive, a set accelerator, a mechanical property enhancing additive, a lost-circulation material, a filtration-control additive, a defoaming agent, a thixotropic additive, a nano-particle, and combinations thereof.

The cement composition can include a filler. Suitable examples of fillers include, but are not limited to, fly ash, sand, clays, and vitrified shale. Preferably, the filler material is in a concentration in the range of about 5% to about 50% by weight of the cement (bwc).

The cement composition can include a set retarder. Suitable examples of commercially-available set retarders include, but are not limited to, HR®-4, HR®-5, HR®-6, HR®-12, HR®-20, HR®-25, SCR-100™ and SCR-500™, marketed by Halliburton Energy Services, Inc. Preferably, the set retarder is in a concentration in the range of about 0.05% to about 10% bwc.

The cement composition can include a friction reducer. Suitable examples of commercially-available friction reducers include, but are not limited to, CFR-2™, CFR-3™, CFR-5™, CFR-6™, and CFR-8™, marketed by Halliburton Energy Services, Inc. Preferably, the friction reducer is in a concentration in the range of about 0.1% to about 10% bwc.

The cement composition can include a strength-retrogression additive. Suitable examples of commercially-available strength-retrogression additives include, but are not limited to, SSA-1™ and SSA-2™, marketed by Halliburton Energy Services, Inc. Preferably, the strength-retrogression additive is in a concentration in the range of about 5% to about 50% bwc.

Commercially-available examples of other additives include, but are not limited to: High Dense® No. 3, High Dense® No. 4, Barite™, Micromax™, Silicalite™, WellLife® 665, WellLife® 809, and WellLife® 810 (marketed by Halliburton Energy Services, Inc. in Duncan, Okla., USA); and HGS6000™, HGS4000™, and HGS10000™ (available from 3M in St. Paul, Minn., USA).

In one embodiment, the cement composition has a density of at least 10 pounds per gallon (ppg) (1.2 kilograms per liter (kg/l)). In another embodiment, the cement composition has a density of at least 15 ppg (1.8 kg/l). In another embodiment, the cement composition has a density in the range of about 15 to about 20 ppg (about 1.8 to about 2.4 kg/l).

According to an embodiment, a method of cementing in a low-temperature subterranean formation comprises: introducing a cement composition into the subterranean formation, the cement composition comprising: (i) cement; (ii) water; and (iii) a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer; and allowing the cement composition to set.

According to the low-temperature method embodiment, the subterranean formation can have a bottomhole temperature in the range of about 70° F. to about 190° F. In one embodiment, the cement composition has an API fluid loss of less than 200 mL/30 min at a temperature of 190° F. (88° C.) and a pressure differential of 1,000 psi (7 MPa). Preferably, the fluid loss additive is in at least a sufficient concentration such that the cement composition has the desired API fluid loss. In another embodiment, the cement composition has an API fluid loss of less than 100 mL/30 min at a temperature of 190° F. (88° C.) and a pressure differential of 1,000 psi (7 MPa). In another embodiment, the cement composition has an API fluid loss of less than 60 mL/30 min at a temperature of 190° F. (88° C.) and a pressure differential of 1,000 psi (7 MPa).

Preferably, the fluid loss additive is thermally stable at a temperature equal to or less than 190° F. Preferably, the molecular weight of the grafted copolymer is such that the fluid loss additive is thermally stable at a temperature equal to or less than 190° F. Preferably, the ratio of the grams of the second polymer to grams of the first polymer is such that the fluid loss additive is thermally stable at a temperature equal to or less than 190° F. Preferably, the fluid loss additive is thermally stable at the bottomhole temperature and pressure of the subterranean formation.

According to another embodiment, a method of cementing in a high-temperature subterranean formation comprises: introducing a cement composition into the subterranean formation, the cement composition comprising: (i) cement; (ii) water; (iii) a clay; and (iv) a fluid loss additive comprising a biodegradable grafted copolymer, wherein the copolymer comprises: (a) a first polymer comprising a monomer or monomers selected from the group consisting of acrylamido-2-methylpropane sulfonic acid, N—N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and (b) a second polymer, wherein the first polymer is grafted onto the second polymer; and allowing the cement composition to set.

According to the high-temperature method embodiment, the subterranean formation can have a bottomhole temperature in the range of about 190° F. to about 400° F. In one embodiment, the cement composition has an API fluid loss of less than 250 mL/30 min at a temperature of 360° F. (182° C.) and a pressure differential of 1,000 psi (7 MPa). Preferably, the fluid loss additive is in at least a sufficient concentration such that the cement composition has the desired API fluid loss. In another embodiment, the cement composition has an API fluid loss of less than 100 mL/30 min at a temperature of 300° F. (149° C.) and a pressure differential of 1,000 psi (7 MPa). In another embodiment, the cement composition has an API fluid loss of less than 60 mL/30 min at a temperature of 300° F. (149° C.) and a pressure differential of 1,000 psi (7 MPa).

Preferably, the fluid loss additive and the clay are thermally stable at a temperature greater than 190° F. Preferably, the molecular weight of the grafted copolymer is such that the fluid loss additive is thermally stable at a temperature greater than 190° F. Preferably, the ratio of the grams of the second polymer to grams of the first polymer is such that the fluid loss additive is thermally stable at a temperature greater than 190° F. Preferably, the clay is in at least a sufficient concentration such that the fluid loss additive and the clay are thermally stable at a temperature greater than 190° F. Preferably, the fluid loss additive and the clay are thermally stable at the bottomhole temperature and pressure of the subterranean formation. In one embodiment, the fluid loss additive and the clay are capable of interacting at a temperature around and greater than 190° F. such that the fluid loss additive has improved thermal stability as well as improved high temperature fluid loss properties.

The method embodiments include the step of introducing the cement composition into a subterranean formation. The step of introducing is for the purpose of at least one of the following: well completion; foam cementing; primary or secondary cementing operations; well-plugging; and gravel packing. The cement composition can be in a pumpable state before and during introduction into the subterranean formation. In one embodiment, the subterranean formation is penetrated by a well. The well can be an oil, gas, water, or injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments also include the step of allowing the cement composition to set. The step of allowing can be after the step of introducing the cement composition into the subterranean formation. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables and figures, the concentration of any ingredient in a cement composition can be expressed as: by weight of the cement (abbreviated as "bwc"); gallons per sack of cement (abbreviated as "gal/sk"); or by weight of the water (abbreviated as "ww"). VA-5637-160 fluid loss additive, obtained from BASF, is a grafted copolymer containing: a copolymer backbone containing gelatin; and acrylamido-2-methylpropane sulfonic acid (AMPS)-co-N—N dimethyl acrylamide (NNDMA). The ratio of the gelatin backbone to AMPS-co-NNDMA was in the range of 10:1 to 1:10 by weight (grams). VA-5637-160 has an average molecular weight of 50,000. THERMA-VIS™ viscosifier is lithium magnesium sodium silicate, which is a synthetic hectorite clay. All of the cement compositions were mixed and tested according to the specified procedure for the specific test as described in The Detailed Description section above.

Table 1 contains API Static Fluid Loss and rheology data for a cement composition having a density of 16.4 pounds per gallon (ppg) (2 kilograms per liter (kg/l)). The cement composition contained: Joppa Class H cement; deionized (DI) water; VA-5637-160 fluid loss additive at a concentration of 1% bwc; SCR-100™ set retarder at a concentration of 0.2% bwc; CFR-3™ friction reducer at a concentration of 0.3% bwc; and D-AIR 3000™ defoamer at a concentration of 0.05 gal/sk. The cement composition was tested for fluid loss at a temperature of 125° F. (51° C.) and a pressure differential of 1,000 psi (7 MPa). Rheology testing was conducted at a temperature of 70° F. (21° C.) and 125° F. (52° C.). As can be seen in Table 1, VA-5637-160 fluid loss additive functions as an effective fluid loss additive at a temperature of 125° F.

TABLE 1

| API Fluid Loss (mL/30 min) | Temp. (° F.) | 600 | 300 | 200 | 100 | 60 | 30 | 6 | 3 |
|---|---|---|---|---|---|---|---|---|---|
| | | | | Rheology | | | | | |
| 46 | 70 | 240 | 130 | 92 | 52 | 34 | 19 | 5 | 4 |
| | 125 | 154 | 74 | 51 | 27 | 18 | 14 | 7 | 4 |

Table 2 contains API Static Fluid Loss, thickening time, compressive strength, and rheology data for a cement composition having a density of 16.4 ppg (2 kg/l). The cement composition contained: Joppa Class H cement; DI water; 1.2% bwc VA-5637-160 fluid loss additive; 0.2% bwc SCR-100™ set retarder; 0.3% bwc CFR-3™ friction reducer; and 0.05 gal/sk D-AIR 3000™ defoamer. The cement composition was tested for fluid loss at a temperature of 150° F. (66° C.) and a pressure differential of 1,000 psi (7 MPa). The test for thickening time was conducted at a temperature of 150° F. (66° C.) and a pressure of 5,500 psi (38 MPa). The test for compressive strength was conducted at 48 hours (hr), a temperature of 150° F. (66° C.) and a pressure of 3,000 psi (21 MPa). Rheology testing was conducted at a temperature of 70° F. (21° C.) and 150° F. (66° C.).

As can be seen in Table 2, VA-5637-160 fluid loss additive functions more effectively as a fluid loss additive at a concentration of 1.2% bwc and a temperature of 150° F. compared to a concentration of 1% bwc at a temperature of 125° F. The cement composition exhibited acceptable compressive strength and rheologies.

TABLE 2

| API Fluid Loss (mL/30 min) | Thickening Time (hr:min) | Compressive Strength (psi) | Temp | 600 | 300 | 200 | 100 | 60 | 30 | 6 | 3 |
|---|---|---|---|---|---|---|---|---|---|---|---|
| | | | | | | Rheology | | | | | |
| 20 | >18:00 | 1,204 | 70° F. | 294 | 166 | 121 | 71 | 48 | 28 | 10 | 6 |
| | | | 150° F. | 113 | 62 | 43 | 26 | 18 | 10 | 4 | 3 |

Table 3 contains API Static Fluid Loss, thickening time, compressive strength, and rheology data for a cement composition in salt water having a density of 16.4 ppg (2 kg/l). The cement composition contained: Joppa Class H cement; DI water; 10% ww NaCl; 1% bwc VA-5637-160 fluid loss additive; 0.3% bwc CFR-3™ friction reducer; and 0.05 gal/sk D-AIR 3000™ defoamer. The cement composition was tested for fluid loss at a temperature of 150° F. (66° C.) and a pressure differential of 1,000 psi (7 MPa). The test for thickening time was conducted at a temperature of 150° F. (66° C.) and a pressure of 5,500 psi (38 MPa). The test for compressive strength was conducted at 24 hours (hr), a temperature of 150° F. (66° C.) and a pressure of 3,000 psi (21 MPa). Rheology testing was conducted at a temperature of 70° F. (21° C.) and 150° F. (66° C.). FIG. 1 is a graph of temperature (° F.) and consistency (Bc) versus time (hr:min) showing the thickening time for the cement composition.

As can be seen in Table 3, VA-5637-160 fluid loss additive exhibited acceptable fluid loss, thickening time, compressive strength, and rheologies in the presence of salt water.

TABLE 3

| API Fluid Loss (mL/30 min) | Thickening Time (hr:min) | Compressive Strength (psi) | Rheology | | | | | | | | |
|---|---|---|---|---|---|---|---|---|---|---|---|
| | | | Temp | 600 | 300 | 200 | 100 | 60 | 30 | 6 | 3 |
| 76 | 4:08 | 2,603 | 70° F. | 184 | 105 | 76 | 44 | 30 | 19 | 8 | 5 |
| | | | 150° F. | 93 | 52 | 41 | 25 | 18 | 11 | 4 | 3 |

Table 4 contains API Static Fluid Loss, thickening time, compressive strength, and rheology data for several cement compositions having a density of 16.4 ppg (2 kg/l) to evaluate the thermal stability of VA-5637-160 fluid loss additive. All of the cement compositions contained at least: Joppa Class H cement; DI water; 0.5% bwc SCR-100™ set retarder; 0.3% bwc CFR-3™ friction reducer; and 0.05 gal/sk D-AIR 3000™ defoamer. Composition A also included 1% bwc VA-5637-160 fluid loss additive. Composition B also included 1% bwc VA-5637-160 fluid loss additive and 1% bwc THERMA-VIS™ viscosifier. Composition C also included 1% bwc THERMA-VIS™ viscosifier. The cement compositions were tested for fluid loss at a temperature of 190° F. (88° C.) and a pressure differential of 1,000 psi (7 MPa). The tests for thickening time were conducted at a temperature of 217° F. (103° C.) and a pressure of 10,200 psi (70 MPa). The tests for compressive strength were conducted at 48 hours (hr), a temperature of 217° F. (103° C.) and a pressure of 3,000 psi (21 MPa). Rheology testing was conducted at a temperature of 70° F. (21° C.) and 190° F. (88° C.).

Figure 2:
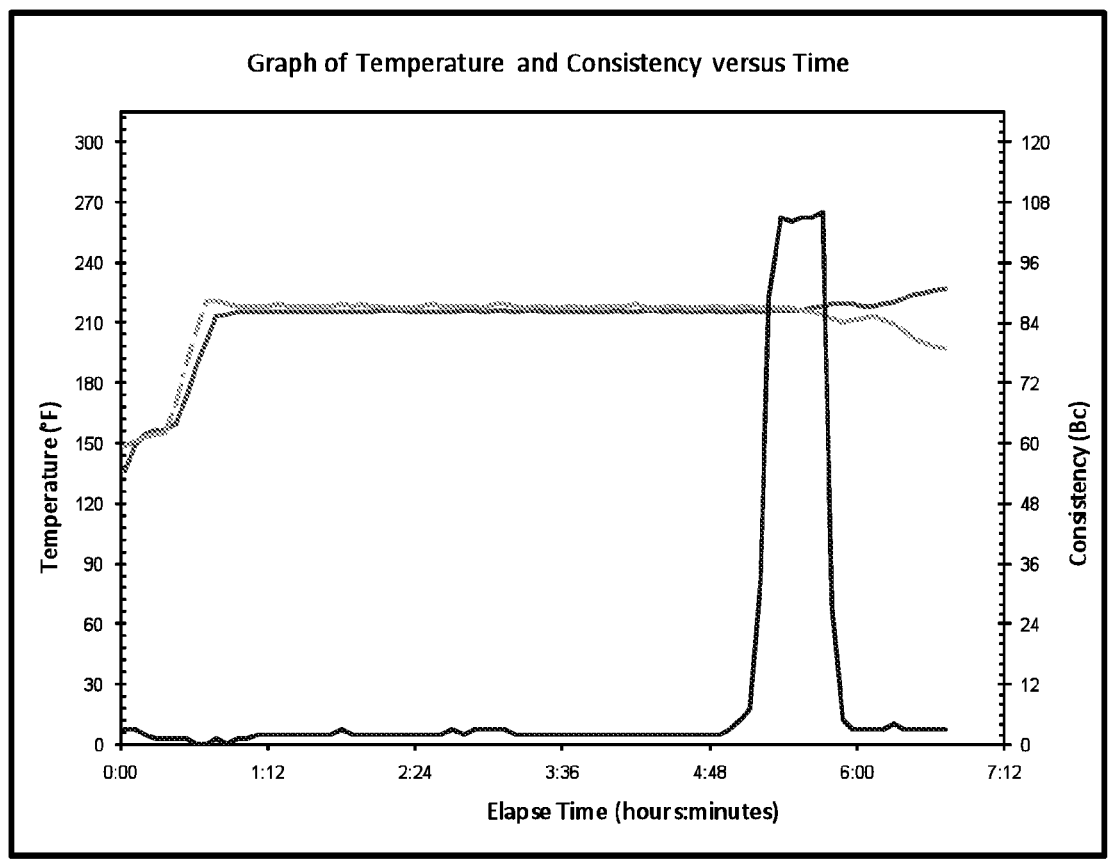
FIG. 2 is a graph of temperature (° F.) and consistency (Bc) versus time (hr:min) showing the thickening time at a temperature of 217° F. (103° C.) and a pressure of 10,200 psi (70 MPa) for a cement composition having a density of 16.4 ppg (2 kg/l). The cement composition contained: Joppa Class H cement; DI water; 1% bwc VA-5637-160 fluid loss additive; 0.5% bwc SCR-100™ set retarder; 0.3% bwc CFR-3™ friction reducer; and 0.05 gal/sk D-AIR 3000™ defoamer.
Figure 3:
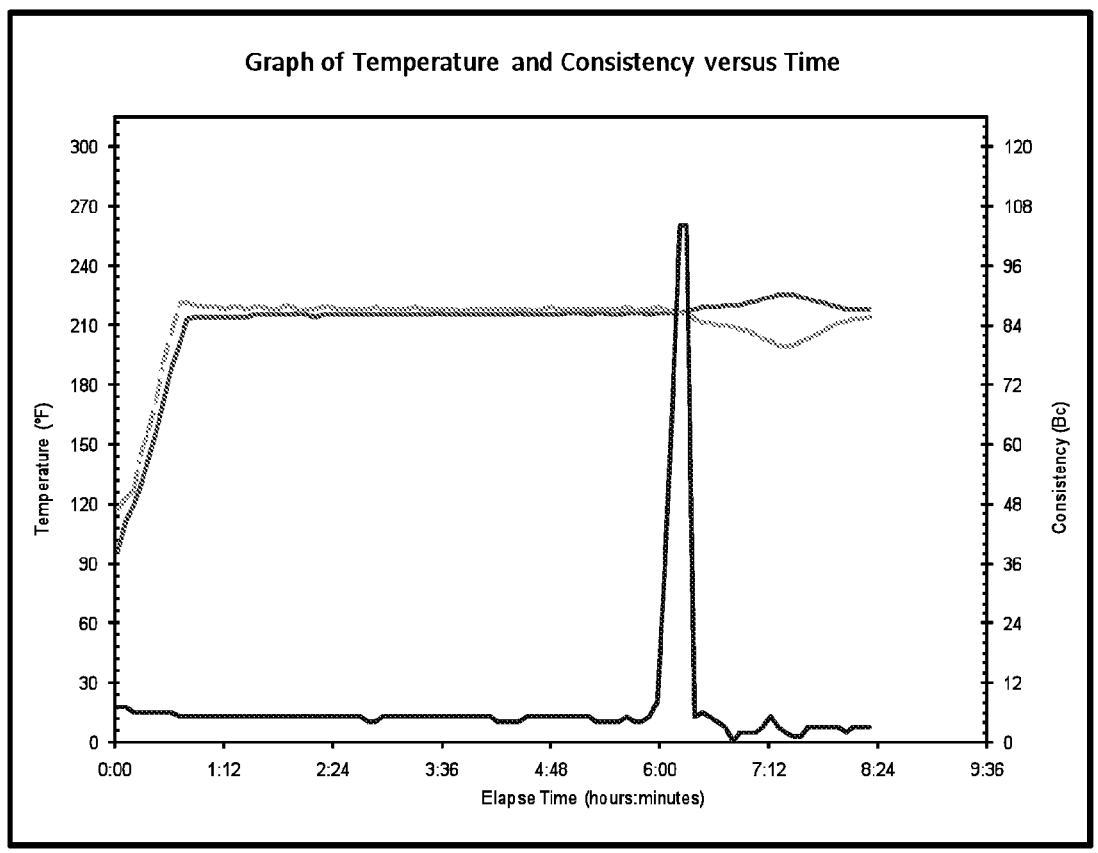
FIG. 3 is a graph of temperature (° F.) and consistency (Bc) versus time (hr:min) showing the thickening time at a temperature of 217° F. (103° C.) and a pressure of 10,200 psi (70 MPa) for a cement composition having a density of 16.4 ppg (2 kg/l). The cement composition contained: Joppa Class H cement; DI water; 1% bwc VA-5637-160 fluid loss additive; 1% bwc THERMA-VIS™ viscosifier; 0.5% bwc SCR-100™ set retarder; 0.3% bwc CFR-3™ cement friction reducer; and 0.05 gal/sk D-AIR 3000™ defoamer.

FIG. 2 is a graph of temperature (° F.) and consistency (Bc) versus time (hr:min) showing the thickening time for cement composition A. FIG. 3 is a graph of temperature (° F.) and consistency (Bc) versus time (hr:min) showing the thickening time for cement composition B.

As can be seen in Table 4, at a temperature of 190° F., the cement composition containing THERMA-VIS™ viscosifier (Composition B) exhibited a much lower fluid loss and comparable thickening time, compressive strength, and rheologies compared to the cement composition that did not contain THERMA-VIS™ viscosifier (Composition A). As can also be seen in Table 4, the cement composition containing VA-5637-160 fluid loss additive (Composition B) exhibited a much lower fluid loss and slightly higher rheologies compared to the cement composition that did not contain VA-5637-160 fluid loss additive (Composition C). Therefore, it appears that at a temperature of 190° F., a cement composition that contains both, a grafted copolymer and a clay, would provide better fluid loss compared to a cement composition that did not contain both.

TABLE 4

| Composition | API Fluid Loss (mL/30 min) | Thick. Time (hr:min) | Comp. Strength (psi) | Rheology | | | | | | | | |
|---|---|---|---|---|---|---|---|---|---|---|---|---|
| | | | | Temp | 600 | 300 | 200 | 100 | 60 | 30 | 6 | 3 |
| A | 315 | 5:22 | 2,151 | 70° F. | 240 | 130 | 92 | 52 | 34 | 19 | 5 | 4 |
| | | | | 190° F. | 95 | 49 | 31 | 17 | 12 | 7 | 3 | 3 |
| B | 38 | 6:08 | 2,148 | 70° F. | 263 | 149 | 106 | 60 | 39 | 21 | 8 | 5 |
| | | | | 190° F. | 59 | 26 | 12 | 9 | 5 | 4 | 2 | 2 |
| C | 269 | — | — | 70° F. | 79 | 38 | 25 | 12 | 6 | 4 | 2 | 1 |
| | | | | 190° F. | 20 | 9 | 6 | 3 | 2.5 | 2 | 2 | 1 |

Table 5 contains API Static Fluid Loss and rheology data for two different cement compositions having a density of 16.4 ppg (2 kg/l) to evaluate the thermal stability of VA-5637-160 fluid loss additive in salt water. Each of the cement compositions contained at least: Joppa Class H cement; DI water; 0.5% bwc SCR-100™ set retarder; 0.4% bwc CFR-3™ friction reducer; 4% ww NaCl; and 0.05 gal/sk D-AIR 3000™ defoamer. Composition A also included 1% bwc VA-5637-160 fluid loss additive and 1% bwc THERMA-VIS™ viscosifier. Composition B also included 1% bwc VA-5637-160 fluid loss additive and 2.5% bwc THERMA-VIS™ viscosifier. The cement compositions were tested for fluid loss at a temperature of 190° F. (88° C.) and a pressure differential of 1,000 psi (7 MPa). Rheology testing was conducted at a temperature of 80° F. (27° C.) and 190° F. (88° C.).

As can be seen in Table 5, VA-5637-160 fluid loss additive function effectively as a fluid loss additive at a temperature of 190° F. in salt solutions with the addition of THERMA-VIS™ viscosifier. As can also be seen the cement composition containing 2.5% bwc THERMA-VIS™ viscosifier (Composition B) exhibited a much lower fluid loss and slightly higher rheologies compared to the cement composition that contained 1% bwc THERMA-VIS™ viscosifier (Composition A).

TABLE 5

| Composition | API Fluid Loss (mL/30 min) | Temp | Rheology | | | | | | | |
|---|---|---|---|---|---|---|---|---|---|---|
| | | | 600 | 300 | 200 | 100 | 60 | 30 | 6 | 3 |
| A | 124 | 80° F. | 199 | 107 | 76 | 42 | 27 | 16 | 7 | 5 |
| | | 190° F. | 50 | 24 | 14 | 7 | 6 | 4 | 3 | 2 |
| B | 38 | 80° F. | 300+ | 212 | 150 | 86 | 58 | 32 | 9 | 6 |
| | | 190° F. | 85 | 33 | 24 | 12 | 8 | 5 | 2 | 2 |

Table 6 contains Stirring Fluid Loss, thickening time, and rheology data for two different cement compositions having a density of 16.4 ppg (2 kg/l) for high-temperature applications. Each of the cement compositions contained at least: Joppa Class H cement; DI water; 1% bwc SCR®100 set retarder; 0.5% bwc COMPONENT R™ cement retarder enhancer; 0.3% bwc CFR-3™ friction reducer; and 0.05 gal/sk D-AIR 3000™ defoamer. Composition A also included 1% bwc VA-5637-160 fluid loss additive and 0.5% bwc THERMA-VIS™ viscosifier. Composition B also included 2% bwc VA-5637-160 fluid loss additive and 1% bwc THERMA-VIS™ viscosifier. The cement compositions were tested for fluid loss at a temperature of 260° F. (127° C.) and a pressure differential of 1,000 psi (7 MPa). The test for thickening time was conducted at a temperature of 260° F. (127° C.) and a pressure of 10,200 psi (70 MPa). Rheology testing was conducted at a temperature of 70° F. (21° C.) and 190° F. (88° C.).

As can be seen in Table 6, for high-temperature applications, the cement composition containing a higher concentration of VA-5637-160 fluid loss additive and THERMA-VIS™ viscosifier (Composition B) exhibited a lower fluid loss and higher rheologies compared to the cement composition containing lower concentrations of VA-5637-160 fluid loss additive and THERMA-VIS™ viscosifier (Composition A). It appears that in order to reduce the rheologies of a cement composition for a high-temperature application, a lower concentration of fluid loss additive and clay can be used with only a slight increase in fluid loss.

TABLE 6

| Composition | API Fluid Loss (mL/30 min) | Thick. Time (hr:min) | Temp | Rheology | | | | | | | |
|---|---|---|---|---|---|---|---|---|---|---|---|
| | | | | 600 | 300 | 200 | 100 | 60 | 30 | 6 | 3 |
| A | 48 | — | 70° F. | 166 | 89 | 62 | 34 | 22 | 12 | 4 | 3 |
| | | | 190° F. | 47 | 22 | 14 | 7 | 5 | 3 | 2 | 2 |
| B | 20 | 14:17 | 70° F. | 300+ | 300+ | 257 | 155 | 104 | 60 | 17 | 11 |
| | | | 190° F. | 167 | 89 | 60 | 40 | 26 | 14 | 4 | 3 |

Table 7 contains Stirring Fluid Loss data at a high-temperature of 300° F., and Stirring Fluid Loss and rheology data at a high-temperature of 360° F. for a cement composition having a density of 16.4 ppg (2 kg/l). The cement composition contained: Joppa Class H cement; DI water; 2% bwc VA-5637-160 fluid loss additive; 1% bwc THERMA-VIS™ viscosifier; 1.2% bwc SCR®100 set retarder; 1.2% bwc COMPONENT R™ cement retarder enhancer; 0.3% bwc CFR-3™ friction reducer; and 0.05 gal/sk D-AIR 3000™ defoamer. The cement composition was tested for fluid loss at a temperature of 300° F. (149° C.) and 360° F. (182° C.), and at a pressure differential of 1,000 psi (7 MPa). Rheology testing was conducted at a temperature of 70° F. (21° C.).

As can be seen in Table 7, at a temperature of 360° F., the cement composition exhibited a much higher fluid loss compared to the cement composition tested at 300° F. This seems to indicate that for a fixed concentration of fluid loss additive and clay, the fluid loss will increase with an increase in temperature.

TABLE 7

| Temperature (° F.) | API Fluid Loss (mL/30 min) | Temp | Rheology | | | | | | | |
|---|---|---|---|---|---|---|---|---|---|---|
| | | | 600 | 300 | 200 | 100 | 60 | 30 | 6 | 3 |
| 300 | 28 | 70° F. | — | — | — | — | — | — | — | — |
| | | 190° F. | — | — | — | — | — | — | — | — |
| 360 | 215 | 70° F. | 300+ | 300+ | 273 | 158 | 111 | 64 | 14 | 11 |
| | | 190° F. | — | — | — | — | — | — | — | — |

Table 8 contains API Static Fluid Loss and some rheology data for several cement compositions having a density of 15.8 ppg (1.9 kg/l) to evaluate the compatibility of VA-5637-160 fluid loss additive and THERMA-VIS™ viscosifier with a different class of cement. The cement compositions contained: Dyckeroff Class G cement; DI water; VA-5637-160 fluid loss additive at various concentrations; THERMA-VIS™ viscosifier at various concentrations; 0.5% bwc SCR-100™ set retarder; and 0.75% bwc CFR-3™ friction reducer. The cement composition was tested for API fluid loss at a temperature of 190° F. (88° C.) and a pressure differential of 1,000 psi (7 MPa). Rheology testing was conducted at a temperature of 70° F. (21° C.) and 190° F. (88° C.).

As can be seen in Table 8, at a temperature of 190° F., the cement compositions that included THERMA-VIS™ viscosifier exhibited a much lower fluid loss compared to the cement composition that did not include THERMA-VIS™ viscosifier. Also, as can be seen in Table 8, for a fixed concentration of THERMA-VIS™ viscosifier, fluid loss decreases with an increase in concentration of VA-5637-160 fluid loss additive. Also, the cement composition containing 1.5% bwc VA-5637-160 fluid loss additive and 1% bwc THERMA-VIS™ viscosifier exhibited a desirable fluid loss and lower rheologies compared to the other cement compositions. Additionally, VA-5637-160 fluid loss additive and THERMA-VIS™ viscosifier are compatible with Class G cement.

TABLE 8

| Conc. VA-5637-160 | Conc. THERMA-VIS ™ | API Fluid Loss | Rheology | | | | | | | |
|---|---|---|---|---|---|---|---|---|---|---|
| (bwc) | (bwc) | (mL/30 min) | Temp | 600 | 300 | 200 | 100 | 60 | 30 | 6 | 3 |
| 1 | 0 | 214 | 70° F. | — | — | — | — | — | — | — | — |
|  |  |  | 190° F. | — | — | — | — | — | — | — | — |
| 1 | 1 | 96 | 70° F. | — | — | — | — | — | — | — | — |
|  |  |  | 190° F. | — | — | — | — | — | — | — | — |
| 1.5 | 1 | 86 | 70° F. | 266 | 146 | 104 | 58 | 38 | 21 | 6 | 4 |
|  |  |  | 190° F. | 52 | 25 | 17 | 9 | 6 | 4 | 2 | 2 |
| 2.5 | 0.5 | 66 | 70° F. | 300+ | 300+ | 265 | 155 | 102 | 59 | 20 | 14 |
|  |  |  | 190° F. | 91 | 51 | 37 | 24 | 17 | 10 | 4 | 3 |
| 2.5 | 1 | 54 | 70° F. | 300+ | 300+ | 300+ | 168 | 112 | 61 | 22 | 14 |
|  |  |  | 190° F. | 102 | 54 | 38 | 21 | 15 | 8 | 3 | 2 |
| 2.5 | 2 | 86 | 70° F. | — | — | — | — | — | — | — | — |
|  |  |  | 190° F. | 115 | 57 | 41 | 24 | 11 | 9 | 3 | 3 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising: introducing a cement composition into the subterranean formation, the cement composition comprising:

(i) cement;
(ii) water;
(iii) a clay; and
(iv) a fluid loss additive comprising a biodegradable grafted copolymer, wherein the copolymer comprises:
(a) a first polymer comprising a monomer or monomers selected from the group consisting of acrylamido-2-methylpropane sulfonic acid, N-N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and
(b) a second polymer,
wherein the first polymer is grafted onto the second polymer; and
allowing the cement composition to set.

2. The method according to claim 1, wherein the subterranean formation has a bottomhole temperature on the range of about 190° F. (88° C.) to about 400° F. (204° C.).

3. The method according to claim 1, wherein the clay is selected from the group consisting of hectorite, bentonite, attapulgite, sepiolite, and combinations thereof.

4. The method according to claim 1, wherein the clay is in a concentration in the range of about 0.05% to about 10% by weight of the cement.

5. The method according to claim 1, wherein the first polymer has an average molecular weight in the range of about 150 to about 1,000.

6. The method according to claim 1, wherein the second polymer has an average molecular weight in the range of about 150 to about 10,000.

7. The method according to claim 1, wherein the fluid loss additive has an average molecular weight in the range of about 5,000 to about 2,000,000.

8. The method according to claim 1, wherein the second polymer comprises a monomer or monomers selected from the group consisting of gelatin, starch, water-soluble proteins, xanthan, guar, lignins, tannins, cellulose, acrylic acid, acrylamide, derivatives of any of the foregoing, and any combination of any of the foregoing.

9. The method according to claim 1, wherein the ratio of grams of the second polymer to grams of the first polymer is in the range of about 10:1 to about 1:10.

10. The method according to claim 1, wherein the fluid loss additive is in a concentration in the range of about 0.05% to about 5% by weight of the cement.

11. The method according to claim 1, wherein the cement composition has an API fluid loss of less than 200 mL/30 min at a temperature of 125° F. (51° C.) and a pressure differential of 1,000 psi (7 megapascals).

12. The method according to claim 1, wherein the subterranean formation is penetrated by a well and the step of introducing is into the well.

13. A method of cementing in a subterranean formation comprising: introducing a cement composition into the subterranean formation, the cement composition comprising:
- (i) cement;
- (ii) water;
- (iii) a hydrophilic clay; and
- (iv) a fluid loss additive comprising a biodegradable grafted copolymer, wherein the copolymer comprises:
  - (a) a first polymer comprising a monomer or monomers selected from the group consisting of acrylamido-2-methylpropane sulfonic acid, N-N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and
  - (b) a second polymer,
  - wherein the first polymer is grafted onto the second polymer; and allowing the cement composition to set.

14. The method according to claim 13, wherein the subterranean formation has a bottomhole temperature on the range of about 190° F. (88° C.) to about 400° F. (204° C.).

15. The method according to claim 13, wherein the clay is selected from the group consisting of hectorite, bentonite, attapulgite, sepiolite, and combinations thereof.

16. The method according to claim 13, wherein the clay is in a concentration in the range of about 0.05% to about 10% by weight of the cement.

17. The method according to claim 13, wherein the first polymer has an average molecular weight in the range of about 150 to about 1,000.

18. The method according to claim 13, wherein the second polymer has an average molecular weight in the range of about 150 to about 10,000.

19. The method according to claim 13, wherein the fluid loss additive has an average molecular weight in the range of about 5,000 to about 2,000,000.

20. The method according to claim 13, wherein the second polymer comprises a monomer or monomers selected from the group consisting of gelatin, starch, water-soluble proteins, xanthan, guar, lignins, tannins, cellulose, acrylic acid, acrylamide, derivatives of any of the foregoing, and any combination of any of the foregoing.

21. The method according to claim 13, wherein the ratio of grams of the second polymer to grams of the first polymer is in the range of about 10:1 to about 1:10.

22. The method according to claim 13, wherein the fluid loss additive is in a concentration in the range of about 0.05% to about 5% by weight of the cement.

23. The method according to claim 13, wherein the cement composition has an API fluid loss of less than 200 mL/30 min at a temperature of 125° F. (51° C.) and a pressure differential of 1,000 psi (7 megapascals).

24. The method according to claim 13, wherein the subterranean formation is penetrated by a well and the step of introducing is into the well.

25. The method according to claim 13, further comprising the step of forming a composite with the clay and the grafted copolymer.

26. A method of cementing in a subterranean formation comprising: introducing a cement composition into the subterranean formation, the cement composition comprising:
- (i) cement;
- (ii) water;
- (iii) a clay, wherein the clay is selected from the group consisting of hectorite, bentonite, attapulgite, sepiolite, and combinations thereof, and wherein the clay is in a concentration in the range of about 0.05% to about 10% by weight of the cement; and
- (iv) a fluid loss additive comprising a biodegradable grafted copolymer, wherein the copolymer comprises:
  - (a) a first polymer comprising a monomer or monomers selected from the group consisting of acrylamido-2-methylpropane sulfonic acid, N-N dimethyl acrylamide, N-vinyl-N-methylaceamide, N-vinylformamide, N-vinylpyrrolidone, acrylonitrile, acrylamide, acrylomorpholine, vinyl alcohol, maleic anhydride, acrylic acid, and any combination thereof; and
  - (b) a second polymer,
  - wherein the first polymer is grafted onto the second polymer; and allowing the cement composition to set.

* * * * *